April 26, 1949.  S. W. SWIPP  2,468,134
NON-FOULING BREECH SEALING RING
Filed July 15, 1947
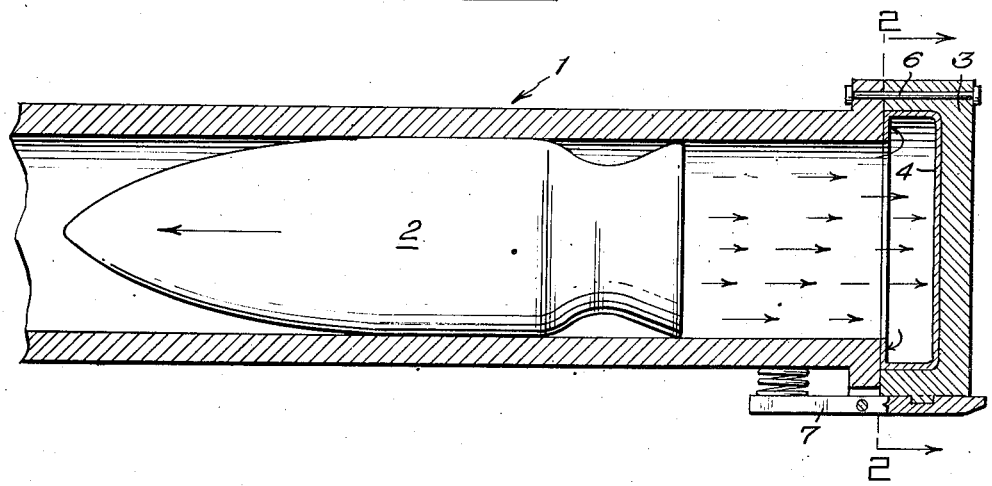
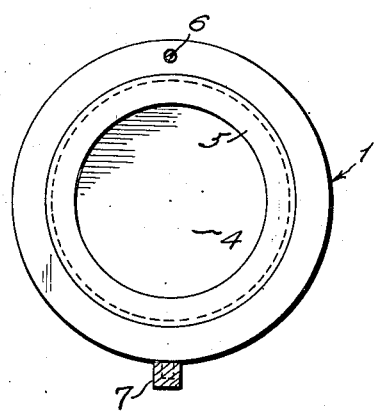
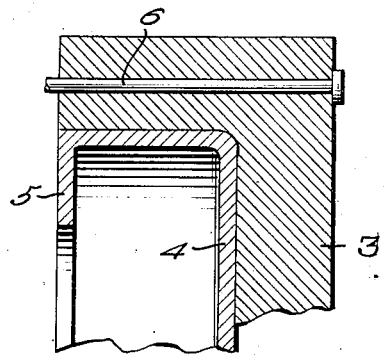
Inventor
Stanley W. Swipp
By J. H. Church + W. E. Thibodeau
Attorneys Patented Apr. 26, 1949

2,468,134

UNITED STATES PATENT OFFICE 2,468,134

NONFOULING BREECH SEALING RING

Stanley W. Swipp, Landover Hills, Md.

Application July 15, 1947, Serial No. 761,123

2 Claims. (Cl. 89—26)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a sealing ring for artillery breechblocks for breech-loading cannon and, in particular, to breechblocks which are opened and closed by sliding action over the breech face.

Breech rings of the prior art have included a protrusion which entered the breech to form an initial seal which was completed by pressure of the gases on firing. This protrusion preempted use of such a sealing ring in sliding breechblocks.

It is therefore an object of the invention to provide a breech ring adapted to form a seal for sliding breechblocks.

To this and other ends, reference is made to the accompanying specification and to the drawings wherein like numerals refer to like parts throughout and in which:

Fig. 1 is an axial section of a projector with breechblock and containing a rocket projectile;

Fig. 2 is a view along the line 2—2 of Fig. 1, and;

Fig. 3 is a fragmentary enlarged view of a detail of the breechblock and sealing ring.

Referring to the figure, 1 refers generally to a rocket projector or other launcher, 2 is a missile to be launched, 3 is a sliding breechblock and 4 is a sealing ring, generally cup-shaped and having an annular flange or lip 5. The breechblock as shown pivots about a pin 6, but other sliding schemes may be employed. A spring-pressed catch 7 prevents backward and sliding motion of the breechblock.

The breechblock 3 is of greater diameter than the breech so as to accommodate the lip 5 coplanar with the faying surfaces and in contact with the breech. The annulus defined by this lip affords a region in which the gas pressure forces the lip against the breech face to complete the seal. This organization has been found in practice to afford a highly efficient seal and one which is free from fouling.

While a sliding breechblock has been shown, it will be understood that my novel sealing ring may also be employed with the type in which contact is made axially of the barrel or tube.

Having thus described my invention, what I desire to claim is:

1. In combination, a breech loading ordnance projection apparatus having a longitudinal bore and a breech portion terminating in an annular planar surface perpendicular to the axis of the barrel, a breech block for closing said breech having a planar face abutting said annular surface, a cavity in said block substantially coaxial with said bore and forming a continuation of said bore, the side walls of said cavity meeting said planar face to form a rim of said cavity abutting said annular surface so that all points on said rim lie between the inner and outer radial limits of said annular surface, thereby leaving a substantial inner radial portion of said annular surface exposed to said cavity, and an integral sheet metal sealing and obturating member closely fitting said exposed surface and at least the adjacent side wall areas of said cavity, whereby pressure of expanding gases in said bore will act to press said member against its contiguous surfaces and thereby seal the joint between said rim and said annular surface.

2. In combination, a breech loading gun barrel having a bore and a breech portion terminating in an annular planar surface perpendicular to the axis of the barrel, a breech block for closing said breech, having a planar face abutting said annular surface, a cup-shaped cavity in said planar face of said block coaxial with the gun barrel, and of substantially larger diameter than the bore of said gun barrel, whereby the inner radial portion of said planar surface is exposed to said cup-shaped cavity, and a cup-shaped sheet metal sealing and obturating member closely fitting said cup-shaped cavity and having an integral annular inwardly extending flange substantially coextensive with said exposed portion of said annular surface.

STANLEY W. SWIPP.

REFERENCES CITED

The following references are of record in the file of this patent:

UNITED STATES PATENTS

| Number | Name | Date |
|---|---|---|
| 43,553 | Broadwell | July 12, 1864 |
| 258,116 | Quick | May 16, 1882 |
| 360,942 | Yates | Apr. 12, 1887 |
| 484,012 | Haskell | Oct. 11, 1892 |
| 1,477,078 | Rimailho | Dec. 11, 1923 |